United States Patent
Ong

(10) Patent No.: US 6,996,652 B1
(45) Date of Patent: Feb. 7, 2006

(54) HIGH-SPEED SEGMENTED DATA BUS ARCHITECTURE

(75) Inventor: Adrian E. Ong, Pleasanton, CA (US)

(73) Assignee: Inapac Technology, Inc., San Jose, CA (US)

( * ) Notice: Subject to any disclaimer, the term of this patent is extended or adjusted under 35 U.S.C. 154(b) by 377 days.

(21) Appl. No.: 10/251,530

(22) Filed: Sep. 19, 2002

(51) Int. Cl.
*G06F 13/14* (2006.01)

(52) U.S. Cl. .................................... 710/305
(58) Field of Classification Search ........... 710/300, 710/107, 305, 316, 105
See application file for complete search history.

(56) References Cited

U.S. PATENT DOCUMENTS

| | | | | |
|---|---|---|---|---|
| 5,375,097 A | * | 12/1994 | Reddy et al. | 365/230.06 |
| 5,491,428 A | * | 2/1996 | Pan | 326/17 |
| 5,627,480 A | * | 5/1997 | Young et al. | 362/17 |
| 5,880,987 A | * | 3/1999 | Merritt | 365/51 |
| 5,938,776 A | * | 8/1999 | Sicola et al. | 714/25 |
| 5,978,880 A | * | 11/1999 | Bruce et al. | 710/316 |
| 6,266,730 B1 | * | 7/2001 | Perino et al. | 710/300 |
| 6,515,516 B2 | * | 2/2003 | Morgan | 326/86 |
| 6,763,415 B1 | * | 7/2004 | Tischler | 710/240 |
| 2002/0075248 A1 | * | 6/2002 | Morita et al. | 345/204 |
| 2003/0072185 A1 | * | 4/2003 | Lane et al. | 35/189.02 |
| 2003/0137865 A1 | * | 7/2003 | Thompson et al. | 365/145 |

* cited by examiner

*Primary Examiner*—Khanh Dang
*Assistant Examiner*—Trisha Vu
(74) *Attorney, Agent, or Firm*—Sidley Austin Brown & Wood LLP

(57) ABSTRACT

A system is provided for driving data signals in an integrated circuit device. The system includes a plurality of functional blocks, each having at least one input/output connection along one side of the integrated circuit device. A data bus comprises a plurality of electrically independent segments. Each segment of the data bus spans a respective portion of the one side of the integrated circuit device. A plurality of lines electrically couple the input/output connections of the functional blocks to the segments of the data bus. The lines are grouped into a plurality of subsets, and each subset is electrically coupled to a different segment of the data bus.

6 Claims, 5 Drawing Sheets

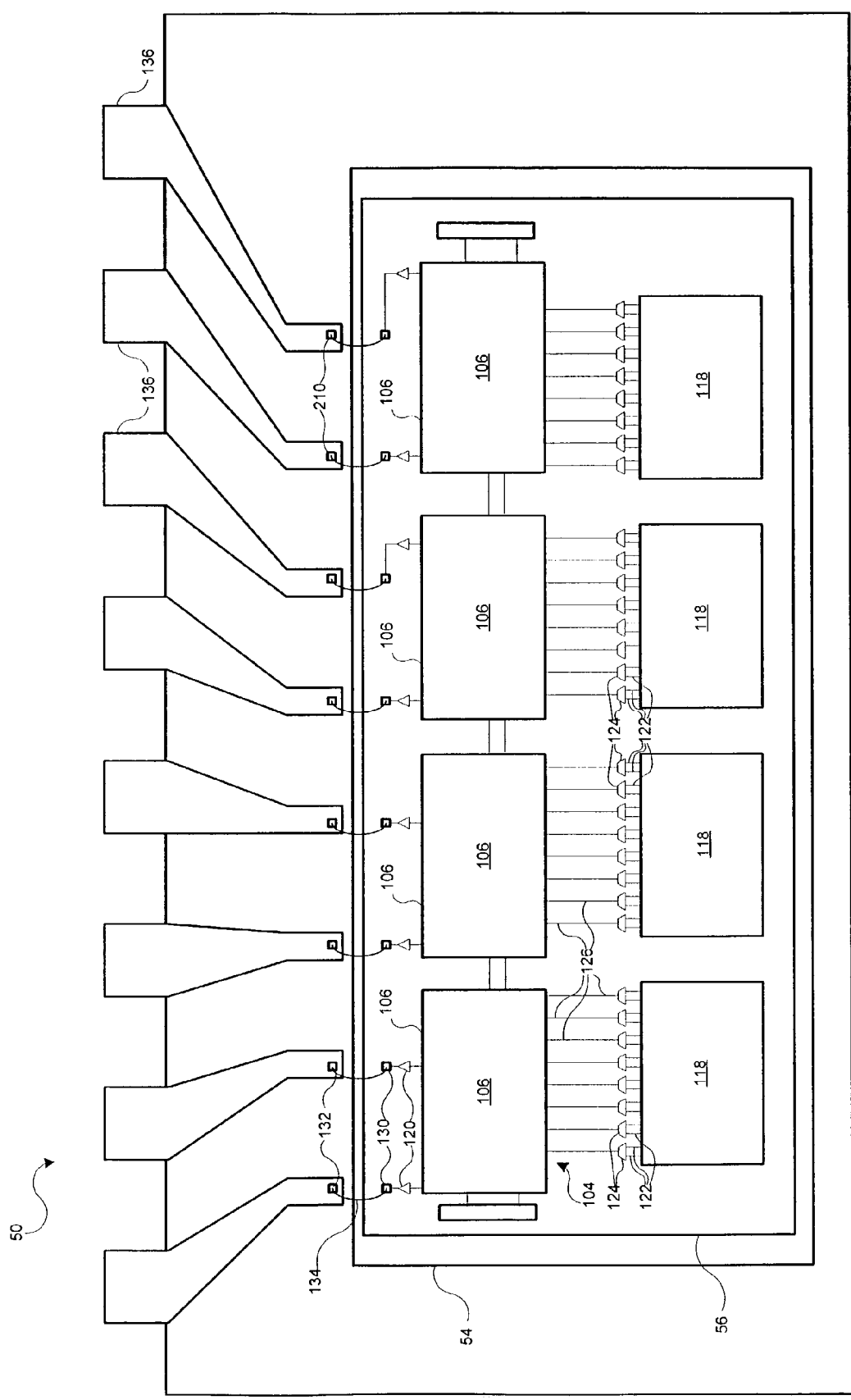

HIGH-SPEED SEGMENTED DATA BUS ARCHITECTURE

TECHNICAL FIELD OF THE INVENTION

The invention relates generally to the field of semiconductor integrated circuits, and more particularly, to a high-speed segmented data bus architecture.

BACKGROUND

Data buses are found in electronic devices such as computer printed circuit boards, integrated circuit devices, personal digital assistants, cellular telephones, and most other electronic devices. A data bus can be a collection of lines that are primarily used to transmit data from one location to another.

Data is represented on a data bus in the form of binary digits, also known as bits. Each bit in turn represents only one of two values, a "0" (also referred to as an "off"), or a "1" (also referred to as an "on"). These two values are physically represented on the data bus in the form of electrical signals. A low voltage signal, ideally at zero volts, corresponds to the "0", while a high voltage signal, ideally at the power supply voltage (e.g., 1.8v or 3.3v), corresponds to the "1". In this description, these low voltage and high voltage signals are also referred to simply as "low signals" and "high signals."

In an integrated circuit (IC) device, a data bus can couple a plurality of devices, such as data banks or memory banks, to a plurality of input/output (I/O) buffers. As used herein, the terms "coupled," "connected," or any variant thereof, means any connection or coupling, either direct or indirect, between two or more elements. These I/O buffers may, in turn, be coupled to leads that can carry the data outside the integrated circuit device. So when data needs to be transmitted from a data bank of an IC device to any other part of a computer, the data normally travels out of the data bank through a bit line, across the data bus, and then out an I/O buffer. And when data needs to be transmitted into a data bank on the IC device, the data comes in through an I/O buffer, travels across the data bus, and then goes into the data bank though a bit line.

FIG. 1 illustrates an integrated circuit device 10 having a data bus architecture 12 implemented according to previously developed techniques. Here, an eight-bit data bus 14 (i.e., composed of eight lines) is formed on a semiconductor die 16. Data bus 14 connects four data banks 18 to I/O buffers 20. Data banks 18 represent any devices or components that can be used in conjunction with a data bus, including but not limited to memory banks (e.g., RAM, DRAM, or ROM) or processing blocks. Each data bank 18 in this architecture 12 is coupled to data bus 14 through bit lines 22, multiplexers 24, and bit lines 26. Each multiplexer 24 is used to multiplex two bit lines 22 down to one bit line 26.

A number of tri-state buffers (not expressly shown) may be used to provide the energy required to drive data signals along bit lines 22 and 24 to I/O buffers 20 across data bus 14. In particular, tri-state buffers drive high data signals from data banks 18 to I/O buffers 20 by providing current to charge data bus 14 up to a high voltage level.

In the previously developed data bus architecture 12, the data bus 14 spans almost the entire side of the semiconductor die 16 on which it is implemented. The length of the data bus 14 gives rise to a significant amount of electrical resistance and/or parasitic or other capacitance. As such, a significant amount of time may be required for the driving tri-state buffers to charge the whole data bus 14 from around zero volts (which is the starting voltage level for data bus 101) up to a voltage level that can be sensed or detected as a high signal by an I/O buffer 20. The greater the length of the data bus 14, the more time is required to charge it to a high level due to increased levels of resistance and capacitance from the increased wire length. All of this time acts to lower the response time of data bus 14, resulting in slower system performance.

The use of a tri-state scheme to drive data signals from data banks to I/O buffers on long data bus lines therefore suffers from limitations. The loading is larger on a tri-state buffer, and a significant amount of time may be required for a tri-state buffer to charge the entire length of the data bus. Accordingly, there is a need for a faster and more dynamic way to drive data signals from data banks to I/O buffers.

The disadvantages and problems associated with driving data signals in previously developed bus architectures, particularly through the use of tri-state buffers, has been substantially reduced or eliminated using the present invention.

According to one embodiment of the present invention, a system is provided for driving data signals in an integrated circuit device. The system includes a plurality of functional blocks, each having at least one input/output connection along one side of the integrated circuit device. A data bus comprises a plurality of electrically independent segments. Each segment of the data bus spans a respective portion of the one side of the integrated circuit device. A plurality of lines electrically couple the input/output connections of the functional blocks to the segments of the data bus. The lines are grouped into a plurality of subsets, and each subset is electrically coupled to a different segment of the data bus.

According to another embodiment of the present invention, a system is provided for driving data signals in an integrated circuit device. The system includes a data bus comprising two or more electrically independent segments. Each segment extends along less than half a length of a side of the integrated circuit device. A data bank has a set of input/output connections. The set of input/output connections comprises two or more subsets, each of the subsets electrically coupled to a different data bus segment.

Important technical advantages of the present invention are readily apparent to one skilled in the art from the following figures, descriptions, and claims.

DESCRIPTION OF THE DRAWINGS

For a more complete understanding of the present invention and for further features and advantages, reference is now made to the following description taken in conjunction with the accompanying drawings, in which:

FIG. 2 is a schematic diagram of an integrated circuit device illustrating one operating environment for the systems and methods of the invention.

DETAILED DESCRIPTION

Figure 1:
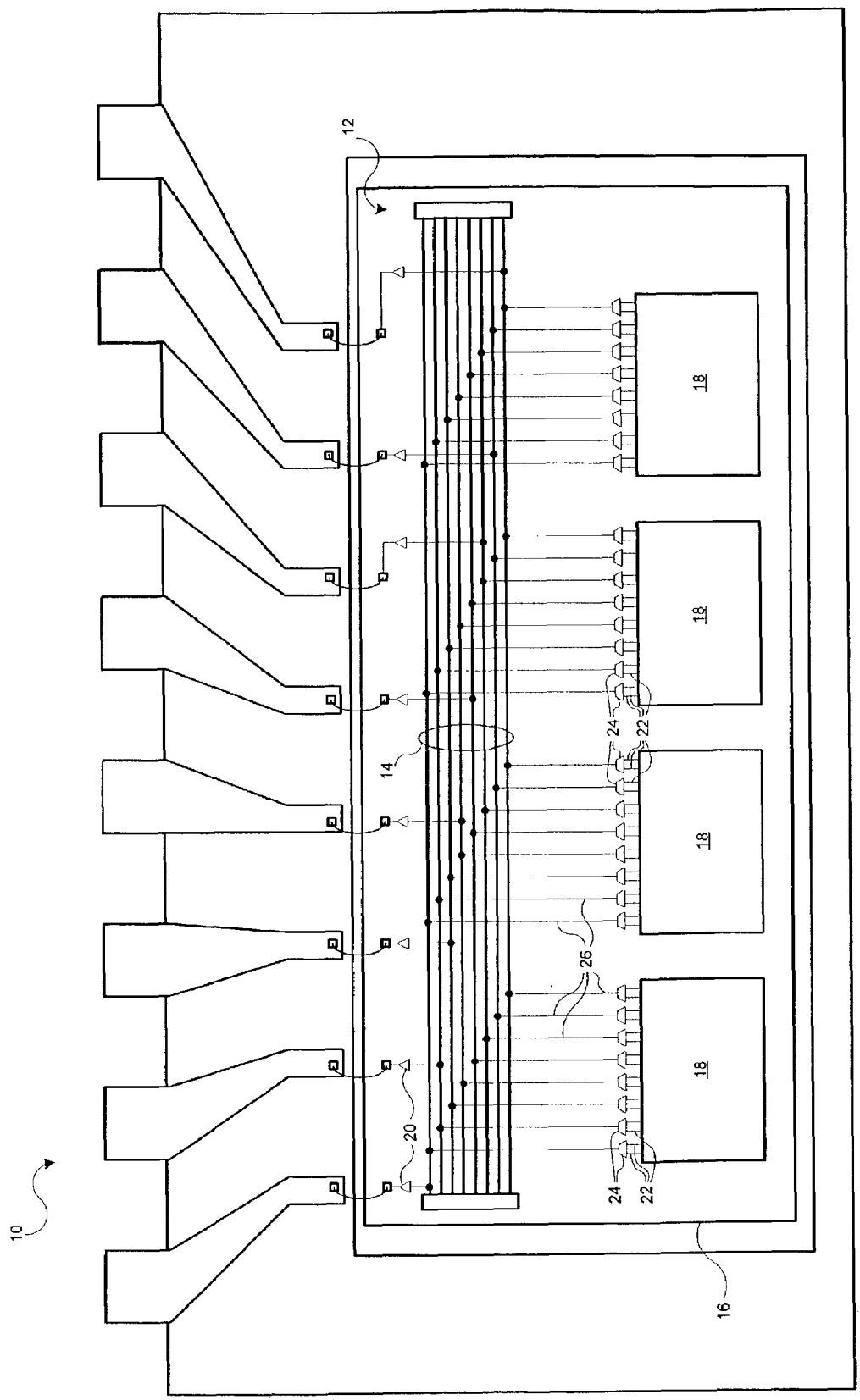
FIG. 1 is a schematic diagram of an integrated circuit device having a prior art data bus architecture.
Figure 3A:
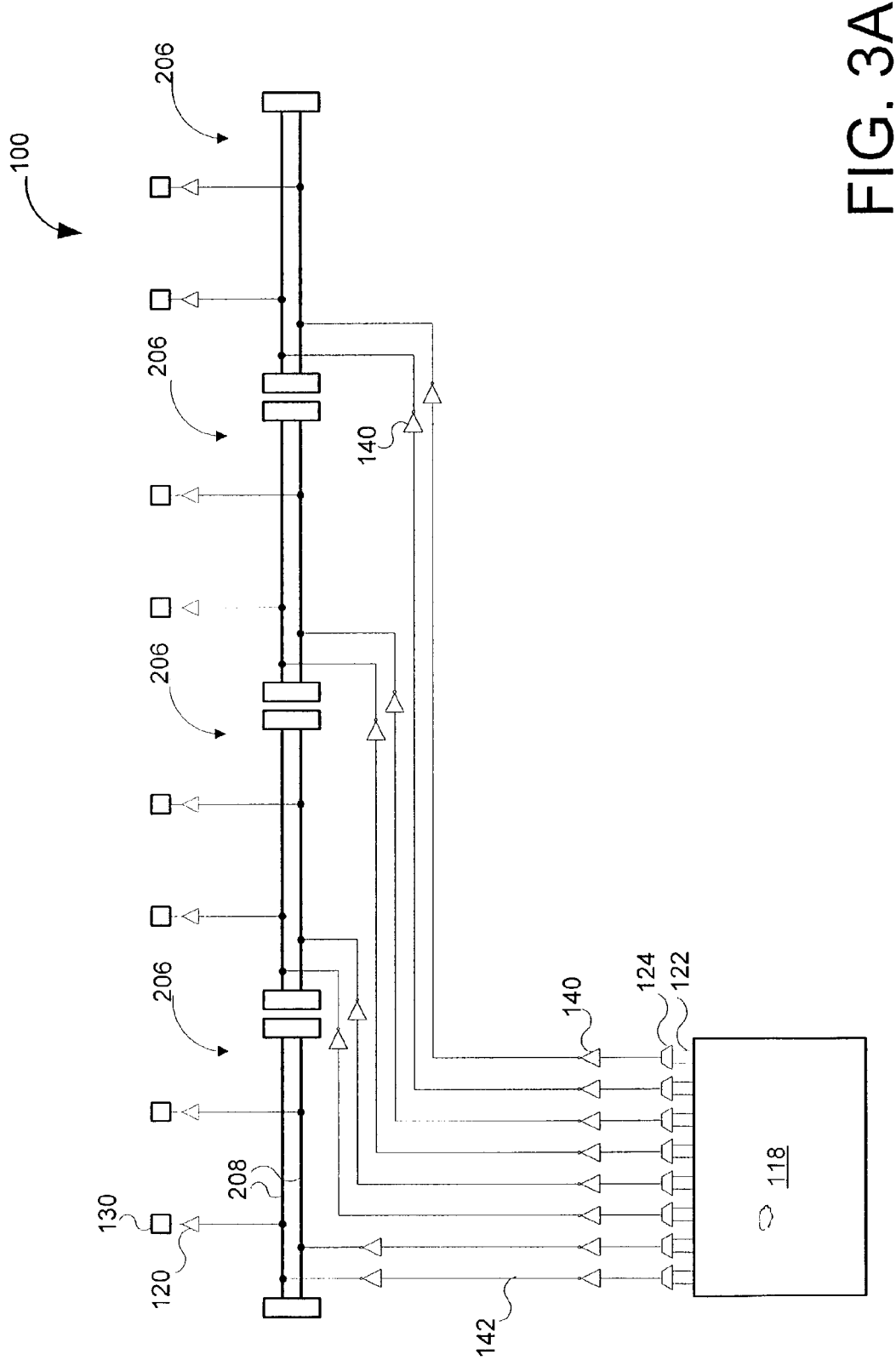
FIGS. 3A and 3B are schematic diagrams of one implementation for a segmented data bus architecture, in accordance with an embodiment of the invention.
Figure 3B:
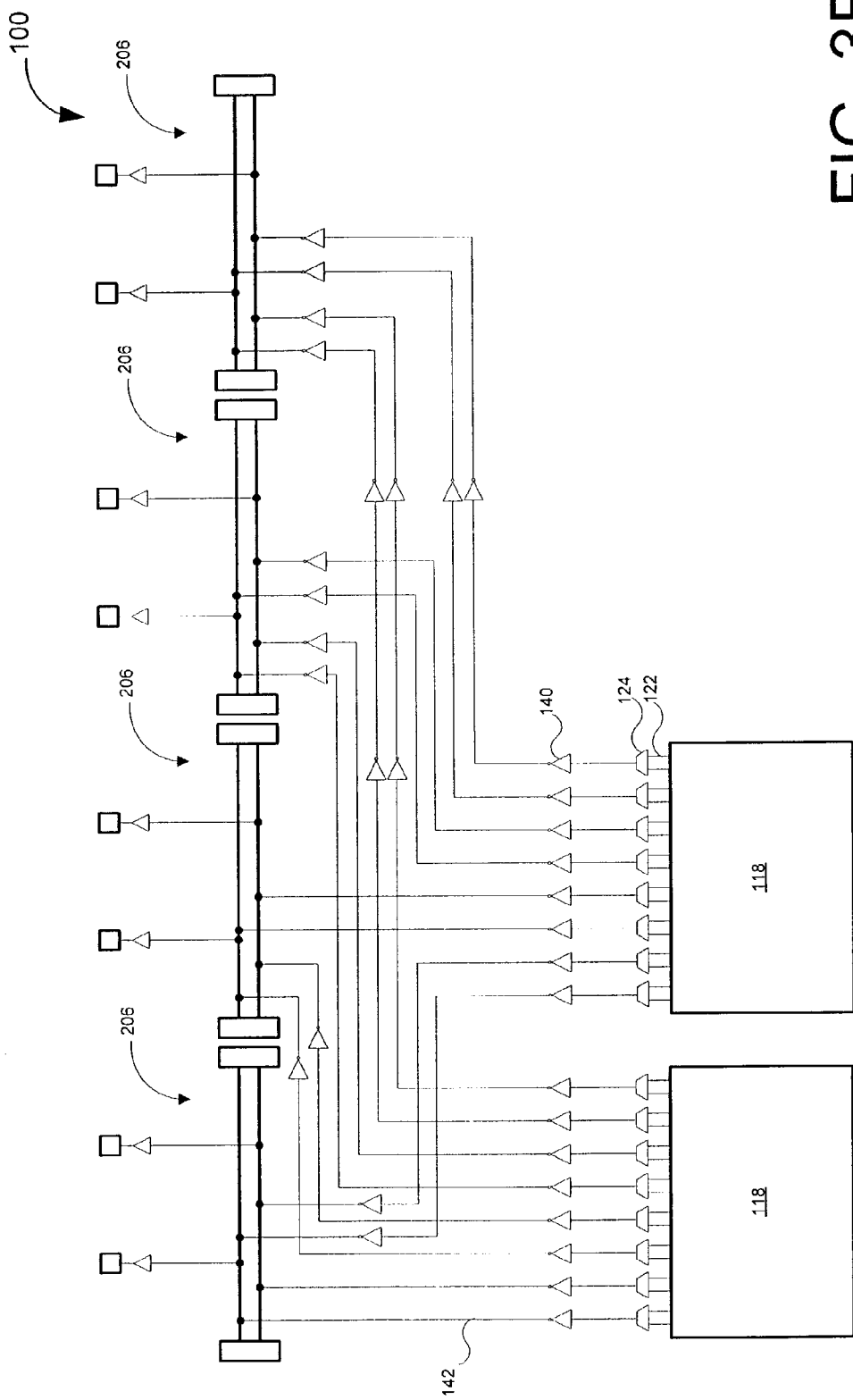
Figure 4:
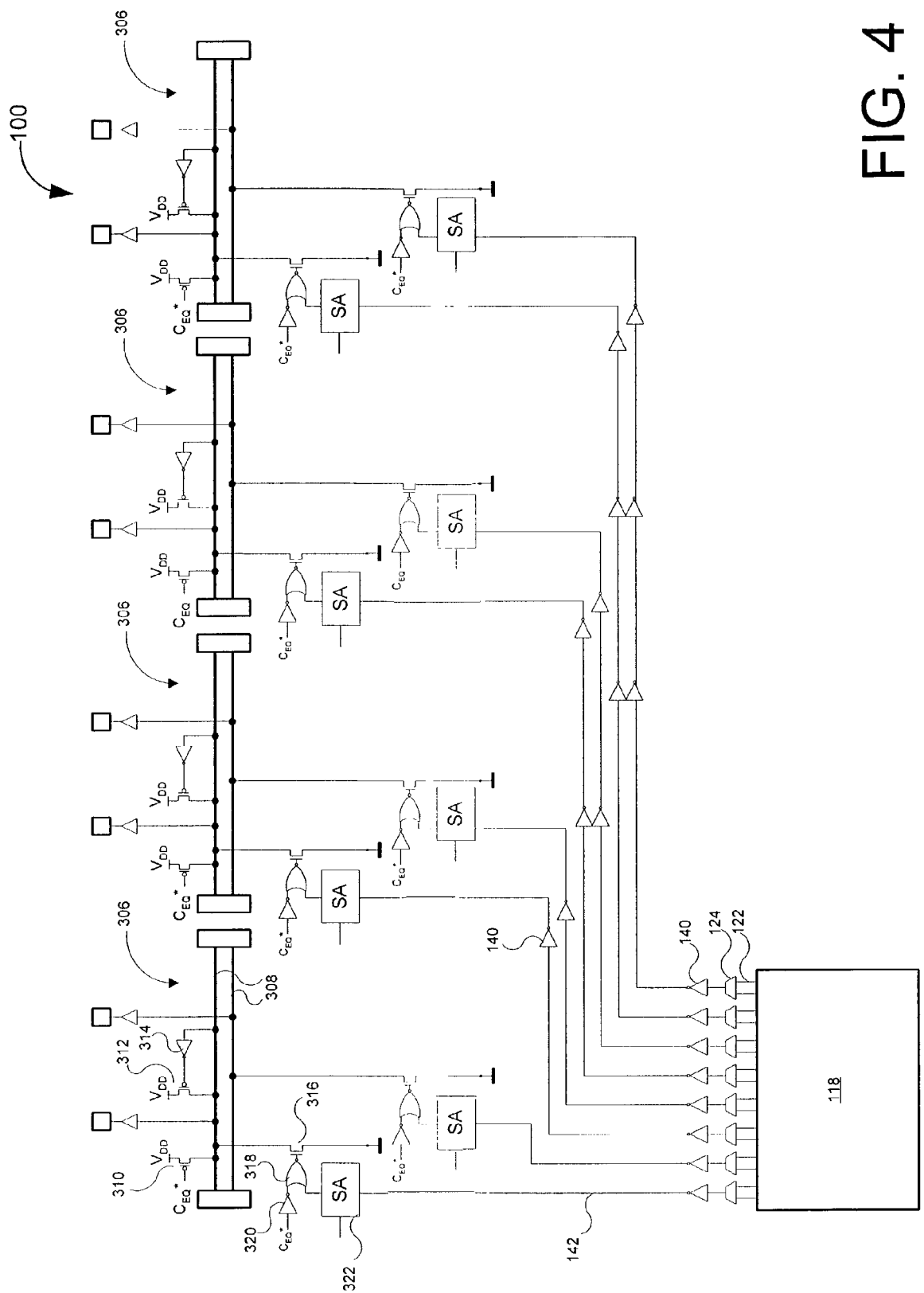
FIG. 4 is a schematic diagram of another implementation for a segmented data bus architecture, in accordance with an embodiment of the invention.

The embodiments of the present invention and their advantages are best understood by referring to FIGS. 2 through 4 of the drawings. Like numerals are used for like and corresponding parts of the various drawings.

Environment

A brief description of one operating environment for the invention is given here to aid in the understanding of the invention. It should be noted that this operating environment is being provided solely for ease in understanding the invention, and should not be interpreted as imposing limitations on the invention. The systems and methods of the invention can be used in environments other than the one described herein.

FIG. 2 illustrates an exemplary operating environment of an integrated circuit device 50 into which embodiments of the invention may be incorporated. Integrated circuit device 50 comprises a package 52 within which a substrate 54 and a semiconductor die 56 are housed.

Various circuitry can be formed on semiconductor die 56. Here, this circuitry includes a data bus architecture 100. The data bus architecture 100 may comprise a data bus 104, which is divided into a plurality of segments 106. Each segment 106 may comprise eight data lines (not expressly shown). As shown, each segment 106 may span only a small portion along the side of semiconductor die 56. Accordingly, the amount of electrical resistance and/or parasitic or other capacitance associated with the data lines in each segment 106 is relatively low compared to that of previously developed data bus architectures where the bus lines extend almost the entire length of a semiconductor die.

The circuitry on semiconductor die 56 also includes data banks 118. Data banks 118 can each comprise one or more arrays of memory cells. Each memory cell functions to store data or information therein. Data banks 118 are coupled to a plurality of bit lines 122 which provide access to the data in the memory cells of data banks 118. In this example there are sixteen bit lines 122 coming off each data bank. Because the number of bit lines 122 (sixteen) exceeds the number of available data bus lines (eight), multiplexers 124 can be used to multiplex the sixteen bit lines down to eight bit lines 126 to match the number of available lines on each data bus segment 106. In general, multiplexers 124 are devices that multiplex (combine) several signals for transmission over a single medium, in this case combining the signals from two bit lines 122 into one signal on a single bit line 126. Each multiplexer 124 may also be capable of de-multiplexing or separating multiplexed signals from a transmission line so that processing of both outgoing and incoming signals is possible. This is one form of an I/O hierarchical scheme used to connect a plurality of data banks 118 to data bus 104. Other forms of I/O hierarchical schemes can also be used in this environment.

A plurality of I/O buffers 120, each coupled on one end to respective lines of data bus 104, are also located on semiconductor die 56. These I/O buffers 120 are used to move data signals off and onto data bus 104. The other ends of I/O buffers 120 are coupled to a first set of bond pads 130, which are in turn connected to a second set of bond pads 132 via bond wires 134. The second set of bond pads 132 are generally located on a set of pins 136. Pins 136 extend from the inside to the outside of integrated circuit device 50 and provide a physical connection for conveying data signals into and out of integrated circuit device 50. It is over this electrical pathway that data signals travel between I/O buffers 120 and the outside of integrated circuit device 50.

Please note that in the foregoing exemplifying operating environment, any number of data banks, bit lines, multiplexers, data bus lines, I/O buffers, or any other element mentioned could be used. The specific numbers used for each element in FIG. 2 are provided for illustrative purposes only and are not to be construed as limiting.

When data is being transmitted into and out of a data bank 118, the timing of different events that occur is important to ensure that I/O buffers 120 or input bit lines sense data signals off data bus 104 at appropriate times. Therefore, the process of moving data signals may be carried out over predetermined cycles that synchronize when these events occur. These are called data-read and data-write cycles.

A data read cycle is a cycle during which a data signal is moved out of or "read" from a data bank 118 through a bit line 126, across a segment 106 of data bus 100, and out the corresponding I/O buffer 120. During the first portion of the data read cycle, a data signal is moved from data bank 118 to data bus segment 106. Then, at a specific moment in time towards the end of the data read cycle, I/O buffer 120 senses the voltage level of data bus 100 to determine whether a high data signal or a low data signal is being transmitted. If I/O buffer 120 senses that the voltage level of the respective line of a data bus segment 106 is high, then a high data signal (a "1") is accordingly transmitted across I/O buffer 120 to bond pads 130 and 132, and then out integrated circuit device 500 via pins 132. But if I/O buffer 120 senses that the voltage level of a data bus segment 106 is low, then a low data signal (a "0") is transmitted out of integrated circuit device 50 over the same pathway. A data write cycle is similar, but moves in the opposite direction.

In operation, data is transferred between data banks 118 and devices external to integrated circuit device 50 using the data bus architecture 100. Unlike previously developed bus architectures which have a single bus with continuous data lines, the data bus 104 of architecture 100 is separated into segments 106. As such, there is less electrical resistance/capacitance in the data lines of each segment 106 (as compared to previously developed bus architectures). Since there is less electrical resistance/capacitance to overcome, the amount of time required to charge the data lines in any given segment 106 up to a voltage level that can be sensed or detected as a high signal by an I/O buffer 120 is reduced. Thus, the data bus architecture 100 provides relatively high-speed transfer of data between data banks 118 and the external circuitry.

FIG. 3A is a schematic diagram of one implementation for a segmented data bus architecture 100, in accordance with an embodiment of the present invention. Data bus architecture 100, which may be incorporated in an integrated circuit device, supports the transfer of data between a data bank 118 and external devices.

As depicted, segmented data bus architecture 100 comprises four sections or segments 206. Each segment 206 can include a two-bit bus (e.g., two lines 208) for transferring data. Each data line 208 of a segment 206 is relatively short (as compared to previously developed bus architectures), and thus, has less electrical resistance/capacitance inherent thereto. Each bus segment 206 may be coupled to respective bonding pads 130 via I/O buffers 120.

Data bank 118 is connected to segments 206 by a combination of bit lines 122, multiplexers 124, buffers 140, and bit lines 142. Multiplexers 124 provide multiplexing between bit lines 122 and bit lines 142. For each bit line 142, there is provided one or more buffers 140 for driving the signals between data bank 118 and the respective bus segment 206. As shown, in one embodiment, two buffers 140 are provided for each bit line 142. In other embodiments, more or fewer buffers 140 may be provided per bit line. Also in other embodiments, the number of buffers 140 provided for the various bit lines 142 can vary from one bit line 142 to another depending on the length of the bit line. Thus, for segments 206 which are located relatively near to data bank 118, fewer or no buffers 140 may be provided for driving signals; whereas for segments 206 which are located relatively distant from the data bank 118, more buffers 140 can be provided.

Each bus segment 206 may support a portion of the signaling to and from data bank 118. As depicted, each of segments 206 is connected to two bit lines 142. In other embodiments, more or fewer bit lines 142 may be connected to each bus segment 206. Each data bank 118 physically located or proximate one side of an integrated circuit device may be connected to some (up to all) of the bus segments 206 on that side of the integrated circuit device. FIG. 3B illustrates multiple data banks 118 coupled to each bus segment 206, with a varying number of buffers 140 provided for the bit lines 142 extending from the data banks 118 to the segments 206.

Referring to FIGS. 3A and 3B, the data lines 208 in each bus segment 206 can be relatively short, and may extend only a small portion of the length (or width) of an integrated circuit device (e.g., approximately one-fourth, one eighth, or one-sixteenth the length or width) compared to that of a previously developed data bus that extends substantially the entire length or width. Accordingly, conductance and resistance along each bus segment 206 is significantly reduced, thereby reducing the amount of time required to drive the bus lines 208 to the proper voltage for a high signal output. This provides for high-speed transfer of data to and from the data bank 118.

FIG. 4 is a schematic diagram of another implementation for a segmented data bus architecture 100, in accordance with an embodiment of the present invention. As depicted, segmented data bus 100 comprises a plurality of segments 306. Each segment 306 supports or provides signaling for a portion of the bit lines 122 or 140 extending from data bank 118. Again, the bus lines 308 in each bus segment 306 are not as long as those of prior art buses that would span a greater length.

In this embodiment, circuitry is provided for pre-charging each data line 308 of the bus segments 306 to an equalization value that is somewhere between ground and the voltage supply. This pre-charging to a mid-level value allows the voltage on data lines 308 to be moved more rapidly to either the high value or the low value, thereby increasing the speed at which data is written into or read out of a data bank 118. In some embodiments, for each data line 308, this pre-charging circuitry may comprise one or more transistors 310 and 312 coupled between a first supply voltage $V_{DD}$ and the data line 308. A transistor 316 may be coupled between the data line 308 and a second supply voltage $V_{ss}$, which can be ground (GND). The gate of transistor 310 may receive an equalization signal $C_{EQ}*$, and the gate of transistor 312 may be coupled to the output of an inverter gate 314 whose input in coupled to the respective data line 308. The gate of transistor 316 may be coupled to the output of a NOR gate 318. One input of NOR gate 318 is connected to the output for an inverter gate 320, and the other input of NOR gate 318 is coupled to the output of a sense amplifier (SA) 322. The input of inverter gate 320 is connected to receive the equalization signal $C_{EQ}*$. For the sake of clarity, pre-charging circuitry is shown for only some of the data lines 308 in FIG. 4. When equalization signal $C_{EQ}*$ goes low, data lines 308 are pre-charged through transistors 310, 312, and 316.

Sense amplifiers 322 function to detect (read) the data stored in the memory cells of data bank 118. Although not shown, one or more write amplifiers may be provided to drive (write) data to the memory cells. Implementations for sense amplifiers and write amplifiers are understood to those of ordinary skill in the art. When equalization signal $C_{EQ}*$ goes high, the sense amplifiers 322 and write amplifiers are able to detect or drive data to and from the data bank 118.

With the combination of the pre-charging circuitry, sense amplifiers, write amplifiers, and the segmentation of data bus 300 into segments 306 in this embodiment, high-speed transfer of data to and from memory bank 118 and external devices is supported.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A system for driving data signals in an integrated circuit device comprising:
   a plurality of functional blocks, each functional block having at least one input/output connection along one side of the integrated circuit device;
   a data bus comprising a plurality of electrically independent segments, each segment spanning a respective portion of the one side of the integrated circuit device;
   a plurality of lines electrically coupling the input/output connections of the functional blocks to the segments of the data bus, wherein the lines are grouped into a plurality of subsets, and each subset is electrically coupled to a different segment of the data bus;
   a charging circuit coupled to each of the data bus segments, wherein the charging circuit is configured to charge the data bus segment to a first voltage level; and
   a pull-down circuit coupled to each of the data bus segments, wherein the pull-down circuit is configured to pull the data bus to a second voltage level.

2. The system of claim 1, wherein each charging circuit comprises:
   a transistor coupled at one end to a power supply and at another end to the respective segment of the data bus, wherein the transistor is controlled by an equilibration signal.

3. The system of claim 1, wherein the pull-down circuit comprises:
   a transistor coupled at one end to the respective segment of the data bus and at another end to ground; and logic circuitry coupled to the input/output connections for controlling the transistor.

4. The system of claim 3, wherein the logic circuitry comprises a first input terminal for receiving an equilibration signal and a second input terminal for receiving a data signal.

5. The system of claim 3, wherein the logic circuitry comprises a NOR gate.

6. The system of claim 3, wherein the logic circuitry comprises an inverter gate.

* * * * *